June 6, 1961  E. G. S. GREENE  2,987,300
HEAT TRANSFER ASSEMBLY
Filed May 29, 1959
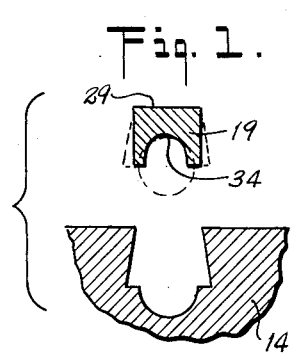
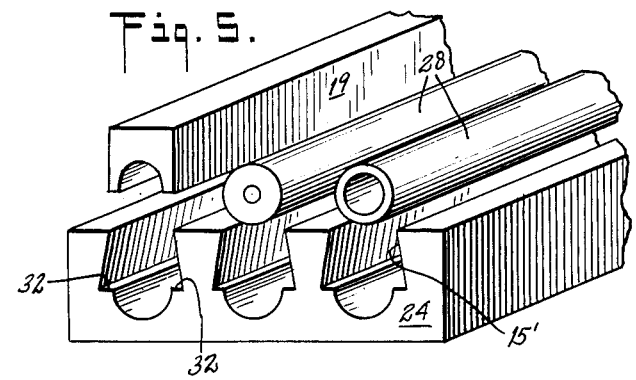
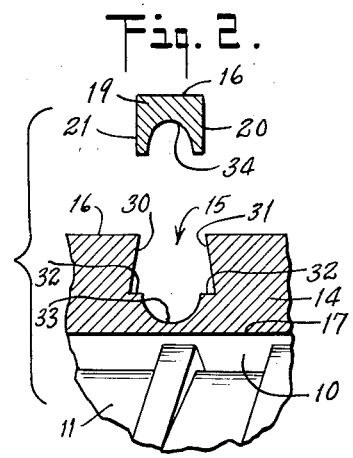
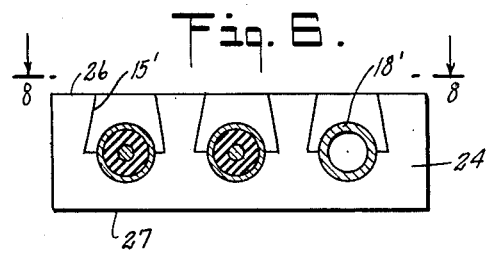
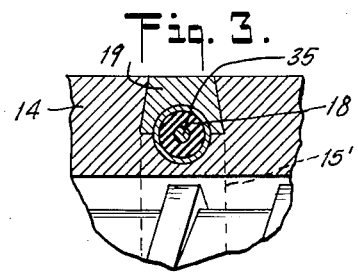
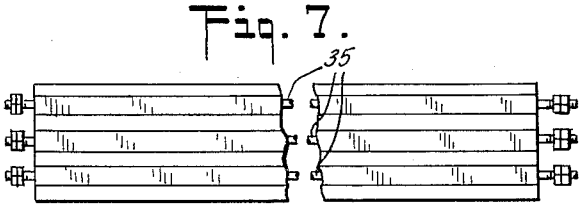
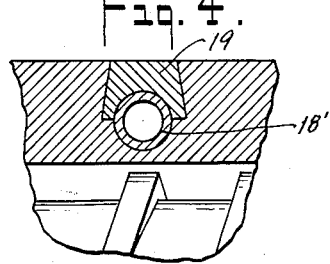
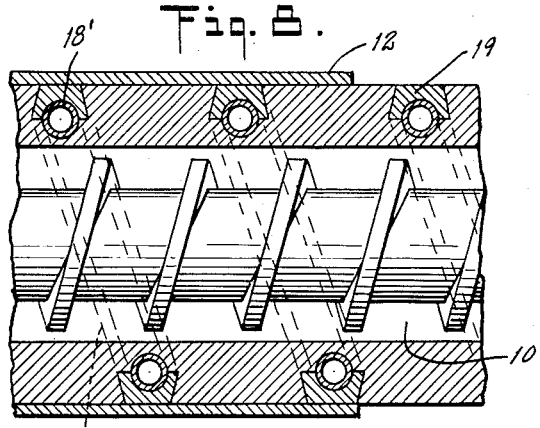
INVENTOR.
EDWARD G. S. GREENE
BY
ATTORNEY

United States Patent Office 2,987,300
Patented June 6, 1961

2,987,300
HEAT TRANSFER ASSEMBLY
Edward G. S. Greene, P.O. Box 473, Far Hills, N.J.
Filed May 29, 1959, Ser. No. 816,950
1 Claim. (Cl. 257—256)

This invention relates to fabrication of heat transfer units of novel features of construction and assembly, enhancing the efficiency and utility thereof, as set forth in the description below and in the accompanying drawings, exemplary of the invention, which includes all other forms coming within the scope and purview of the appended claim.

In the drawings:

FIG. 1 is a schematic view of parts of a heat transfer assembly embodying the invention prior to assembly, FIG. 2 is a similar, exploded view, showing application of the invention to a plastic machine, FIG. 3 is a similar view, showing the parts assembled and with a heating tube positioned therein, FIG. 4 is a similar view, showing a cooling tube positioned in the assembly, FIG. 5 is an unassembled perspective view of another form of the invention, FIG. 6 is an assembled end elevational view thereof, FIG. 7 is a top plan view thereof, taken at line 8—8 of FIG. 6, and FIG. 8 is a fragmentary, sectional view of a plastic fabricating machine, showing the invention applied thereto.

Similar reference characters indicate corresponding parts throughout the several views.

The invention is applicable to heat transfer devices, such as, for example, plastic fabricating machines having an extrusion barrel 10 through which the plastic material is advanced as by a worm or ram 11 toward an extrusion die or other plastic forming parts of the machine. The barrel 10 is heated at certain zones by electric band heating elements wrapped therearound as shown at 12 (FIG. 8).

Pursuant to the invention, heat transfer means are provided consisting of forming the wall base portion 14 of the barrel 10 with recesses 15 (FIG. 2) from the outer or top face 16 of the base extended toward but short of the bottom or inner face 17 thereof, defining, between said faces, the thickness of said base portion. In the form of the invention shown in FIG. 8 as applied to a circular, elongated barrel 10 of a plastic forming machine, the recess 15 is formed helically. The heat transfer tubes 18, 18' may be correspondingly formed or positioned helically in the recesses; the tubes 18, 18' may be formed or positioned in straight line form where (FIG. 3) the recesses 15 are formed as spaced parallel circles at right angles to the longitudinal axis of the member 10 (FIG. 3).

As shown in FIGS. 5, 6 and 7, the base portion 24 of the heat transfer assembly of the invention may be formed of cross sectionally solid material having top and bottom faces 26, 27 disposed in spaced relation and defining, therebetween, the thickness of the base member 24. The invention is there shown applied in the form of a Calrod heater, the base portion 24 being formed essentially as a rectangular block, the recesses 15' being disposed longitudinally inwardly of the top face 26 of said base member. The heat transfer tubes 28 in this form of the invention are formed as straight rods (FIGS. 5 and 7) positioned in straight line relation in the recesses 15 of base member 24 (the terms "base" and "wall" members are used in this application interchangeably).

Pursuant to the invention, a holder 19 (FIG. 1) is provided for securing each heat transfer tube 18 in the recess 15 on assembly of the parts, as below more particularly described.

The recess 15 is formed with side walls 30, 31 extending from the top face 16 (FIG. 2) 26 (FIG. 6) of the base member and diverging therefrom and terminating short of the bottom face of said member and shouldered portions 32 are formed in said recesses extending inwardly of the lower ends of the side walls 30, 31 thereof and directed toward but terminating short of each other and an arcuate portion 33 is formed at the bottom of the recess as complementary to the recess 34 of holder 19 when (FIG. 3) holder 19 has been positioned in the wall 14, heat transfer tube 18 being positioned in said recesses (FIGS. 3 and 4). The holder block is made of a material which is expansible under pressure and is positioned in the recess to expand and interlock therein, with the tube 18 thus immovably held in place. The holder block 19 is formed to define cross sectionally a pair of side walls 20, 21 (FIG. 2) spaced apart substantially for the spacing of the recess 15 at the top face of the base member 24 and is of a length substantially equal to the distance from the top face of the recess to the shouldered portions 32 of the recess. The arcuate recess 34 at the bottom of the block 19 is formed of smaller radius than the radius of the heat transfer tube 18 to be positioned therein, whereby, when the holder 19 and tube 18 are inserted into the base member recess 15 and the block is pressed toward the bottom face of the base member, the block will expand into the base member recess, the side walls 20, 21 of block 18 expanding against the shouldered portions 32 of the recess and interlocking therewith, holder 19 is so proportioned that, with the parts assembled as above described and shown in FIG. 3, the holder will smoothly fill the recess and conform to the top face 16 of the base member 24.

The invention is applicable to the securing of heat transfer tubes 18 such as wire or other cables or tubes; as shown at 35 in FIGS. 3 and 7, the heat transfer tubes are used for heating the base member. Said heat transfer tubes may be hollow interiorly as shown at 18' in FIG. 6 so that a heat transfer liquid for example, may be passed therethrough. The invention may be used in connection with other heat transfer media such as for example, the electric band heater 12 shown in FIG. 8 to supplement or detract (locally or for zones) from the heat transfer properties of the device.

Having thus described my invention, what I claim as new and desire to secure by Letters Patent is:

A heat transfer assembly comprising a solid base member with an outwardly-opening elongated recess, the inner portion of which is substantially semi-circular in cross-section and terminates in shoulders extending laterally therefrom, the outer portion of said recess being defined by surfaces converging to the outer surface of said base member from the outer edges of said shoulders, a heat-transfer tube closely fitted in said semi-circular recess portion, and a holder block locking said tube in place by having an inwardly-opening recess substantially semi-circular in cross-section in its entirety and of smaller diameter than said tube, forced in said base member recess to expand its recess about and in conformity with said tube, with the side walls thereof spread to engage the converging surfaces and the ends thereof engaging said shoulders.

(References on following page)

References Cited in the file of this patent

UNITED STATES PATENTS

| | | |
|---|---|---|
| 1,305,170 | Ross | May 27, 1919 |
| 1,796,123 | Samesreuther et al. | Mar. 10, 1931 |
| 1,989,955 | Van Patter | Feb. 5, 1935 |
| 2,612,351 | Janos | Sept. 30, 1952 |
| 2,721,729 | Van Riper | Oct. 25, 1955 |
| 2,875,312 | Norton | Feb. 24, 1959 |

FOREIGN PATENTS

| | | |
|---|---|---|
| 476,171 | Great Britain | Dec. 2, 1937 |